US007098785B2

(12) United States Patent
Wong et al.

(10) Patent No.: US 7,098,785 B2
(45) Date of Patent: Aug. 29, 2006

(54) JUVENILE MONITORING SYSTEM

(75) Inventors: Anthony Wong, Franklin, MA (US); Andrew W. Marsden, Hingham, MA (US)

(73) Assignee: Cosco Management, Inc.

( * ) Notice: Subject to any disclaimer, the term of this patent is extended or adjusted under 35 U.S.C. 154(b) by 0 days.

(21) Appl. No.: 10/697,625

(22) Filed: Oct. 30, 2003

(65) Prior Publication Data

US 2005/0093693 A1 May 5, 2005

(51) Int. Cl.
*G08B 1/08* (2006.01)
*H04Q 7/00* (2006.01)

(52) U.S. Cl. ............................ 340/539.15; 340/539.1; 340/539.11

(58) Field of Classification Search ............ 340/573.1, 340/539.1, 539.11, 539.22, 539.15, 539.26; 455/73; 348/143, 152–156, 159
See application file for complete search history.

(56) References Cited

U.S. PATENT DOCUMENTS 3,909,826 A 9/1975 Schildmeier et al.
4,019,737 A * 4/1977 Witzel ........................ 273/277
5,103,206 A 4/1992 Yu
5,512,880 A * 4/1996 Abrams et al. .......... 340/573.4
5,640,147 A 6/1997 Chek
5,686,886 A 11/1997 Stensney
5,768,696 A * 6/1998 Law ........................ 455/127.1
5,905,438 A 5/1999 Weiss et al.
6,043,747 A * 3/2000 Altenhofen .............. 340/573.1
6,072,392 A * 6/2000 Henderson et al. .... 340/539.15
6,091,329 A * 7/2000 Newman ............... 340/539.15
6,313,733 B1 * 11/2001 Kyte ......................... 340/7.22
6,462,664 B1 10/2002 Cuijpers et al.
6,486,777 B1 11/2002 Clark
6,507,306 B1 * 1/2003 Griesau et al. ............. 341/176
6,529,131 B1 3/2003 Wentworth
6,593,851 B1 * 7/2003 Bornstein .............. 340/539.15
6,650,241 B1 * 11/2003 Osborne et al. ......... 340/573.1
6,744,463 B1 * 6/2004 Rye et al. ................... 348/159
6,766,145 B1 * 7/2004 Fitzgerald et al. ....... 455/67.11
2002/0196149 A1 12/2002 Halleck et al.

FOREIGN PATENT DOCUMENTS

GB 2366943 A * 3/2002

OTHER PUBLICATIONS

Uniden America Corporation, Trunk Tracker III Operating Guide, 2002.*

* cited by examiner

*Primary Examiner*—Thomas Mullen
*Assistant Examiner*—Travis R. Hunnings
(74) *Attorney, Agent, or Firm*—Barnes & Thornburg LLP

(57) ABSTRACT

The present remote child monitoring system includes a plurality of transmitters for transmitting audio signals at different frequencies from different locations and at least one receiver remote from the transmitters for receiving and announcing the transmitted audio signal from the plurality of transmitters. The receiver has a first mode for sequentially announcing the transmitted audio from the transmitters and a second mode for announcing the audio from a selected transmitter.

23 Claims, 2 Drawing Sheets

JUVENILE MONITORING SYSTEM

BACKGROUND

The present disclosure relates to remote monitoring systems and more specifically to a remote child monitoring system.

Remote child monitoring systems have generally included a transmitter attached to or near a child and a receiver attached to or near the adult or other responsible individual. These systems have included the ability to monitor whether the transmitter and receiver are within range of each other or outside a required range and have also allowed the ability for the receiver to monitor the conditions at the transmitter. In homes, intercom systems have been used to listen, for example, from a kitchen, to a child sleeping in his or her room.

SUMMARY

The present remote child monitoring system includes a plurality of transmitters for transmitting audio at different frequencies from different locations and at least one receiver remote from the transmitters for receiving and announcing the transmitted audio signal from the plurality of transmitters. The receiver has a first mode for sequentially announcing the transmitted audio from the transmitters and a second mode for announcing the audio from a selected transmitter. The receiver continuously and sequentially announces the transmitted audio from the transmitters in the first mode. More than one receiver may be provided in the system. Also, at least one of the receivers has a transmission mode so as to communicate with the other receiver.

The receiver includes an indication of which transmitter is being announced. It may also include an indication of the level of audio received or being announced. The transmitters and receivers may be portable and include a battery source or a plug for a power outlet.

These and other aspects of the present disclosure will become apparent from the following detailed description, when considered in conjunction with accompanying drawings.

DETAILED DESCRIPTION OF THE DRAWINGS

Figure 1:
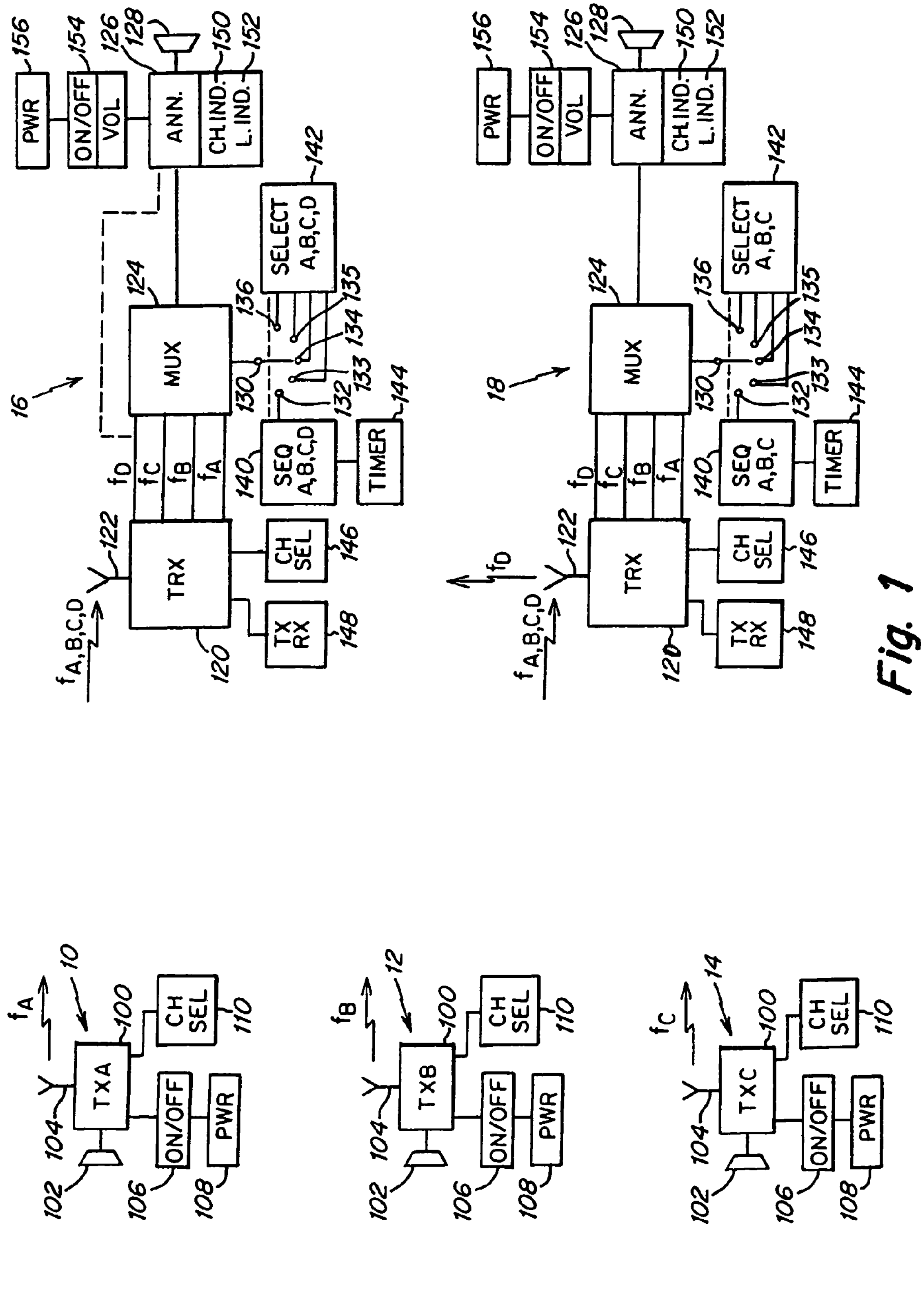
FIG. 1 is a block diagram showing the electrical, functional elements of three transmitters and two receivers according to the present disclosure.
Figure 2:
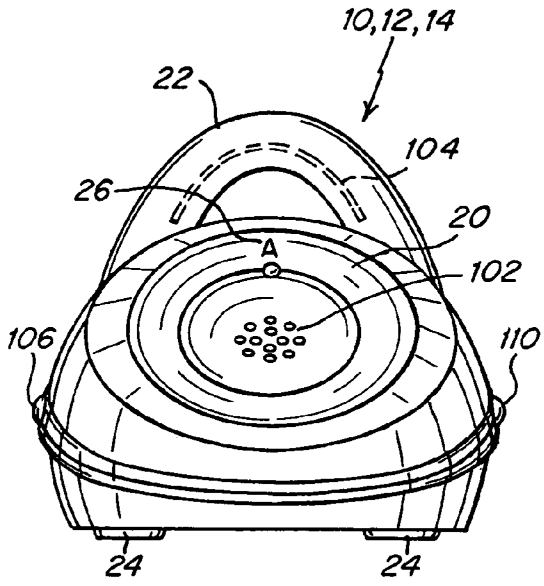
FIG. 2 is a front view of a transmitter according to the present disclosure.
Figure 3:
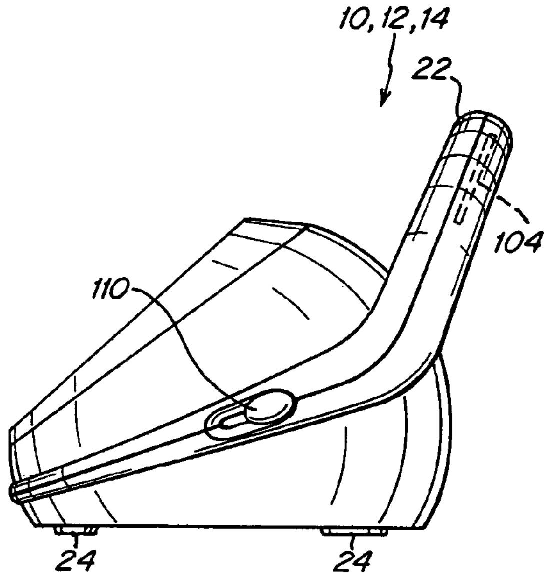
FIG. 3 is a side view of the transmitter of FIG. 2.

An example of a remote child monitoring system is illustrated in FIG. 1 as including three transmitters 10, 12, 14 and two receivers 16, 18. Generally, the transmitters 10, 12, 14 are portable and are positioned in an area to be monitored. The transmitters 10, 12, 14 may be placed in adjacent rooms, various rooms in the house or in other areas where the child may roam. One or more of the two receivers 16, 18 may be portable and carried by one or both of the parents, caretaker or responsible adult. Audio signals of all three transmitters 10, 12, 14 are transmitted at different frequencies to the receivers 16, 18 to be announced. The receivers 16, 18 have two modes of operation. In the first mode, the audio signals received from transmitters 10, 12, 14 are sequentially announced one after the other. In the second mode, the audio signal from a selected transmitter 10, 12 or 14 may be announced. This allows the person at the receivers 16, 18 to listen sequentially to all of the transmitters 10, 12, 14 and then stop and listen to a transmitter's specific location to further monitor the conditions. Alternatively, they may just select one location and transmitter without prior sequencing. Once activated or turned on, the transmitters 10, 12, 14 transmit continuously.

The receivers 16, 18 have an indication of which transmitter 10, 12 or 14 is being announced. It may also have an indication of the level of the transmitted or announced signal. Generally, the period of announcement in the sequential process is from 3 to 10 seconds.

Referring to FIGS. 2 through 5, each of the transmitters 10, 12, 14 may have a different color face plate 20. Also, an indicia 26 (for example, A, B, C) may be provided on the various transmitters 10, 12, 14. Transmitter indicators on the receivers 16, 18 include three color panels 32, 34, 36, each corresponding to a color of the face plate 20 of the transmitters 10, 12, 14. Also, the indicia A, B, C are listed on the panels 32, 34, 36.

These panels 32, 34, 36 are illuminated or back lit when its corresponding transmitter is being announced. Each transmitter 10, 12, 14 includes a microphone 102, an antenna 104 in handle 22 and an on/off switch 106. Feet 24 are provided on the bottom.

Each of the transmitters 10, 12, 14 also includes a channel select 110. This allows the transmission frequencies for transmitters 10, 12, 14 to be $f_{A1}$ or $f_{A2}$, $f_{B1}$ or $f_{B2}$ and $f_{C1}$ or $f_{C2}$, respectively. Although the selection of two frequencies are being described, more than two frequencies may be used. When this option is provided, the receivers 16, 18 also include a channel select 146 (see FIG. 1) which corresponds to the selection of the selected frequencies for each of the transmitters 10, 12, 14. Thus, if there are three transmitters each having two settings, the channel select 146 would include six possible settings—two for each of the transmitters. The channel selector 110 on the transmitters 10, 12, 14 may be a simple switch having two positions. Channel select 146 on the receivers 16, 18 may be three DIP switches, each having two positions.

The receivers 16, 18 include an announcer, shown as a speaker 128, transmitter indicators 32, 34, 36 (150) and a signal level indicator 152. The level indicator 152 indicates the level of the received audio signal being announced. For example, as illustrated as five bars, panels 40, 42, 44, 46, 48 are sequentially and accumulatively lit such that the number of panels lit illustrate the level of the transmitted or received signal. Each of the panels 40, 42, 44, 46, 48 that are backlit may be the same or different colors.

The transmitter indicators 32, 34, 36 may also function as a transmitter select device 142. It may be push buttons or other touch-sensitive devices. A scan select device 52 (140) may also be a push button or other touch-sensitive device.

Figure 4:
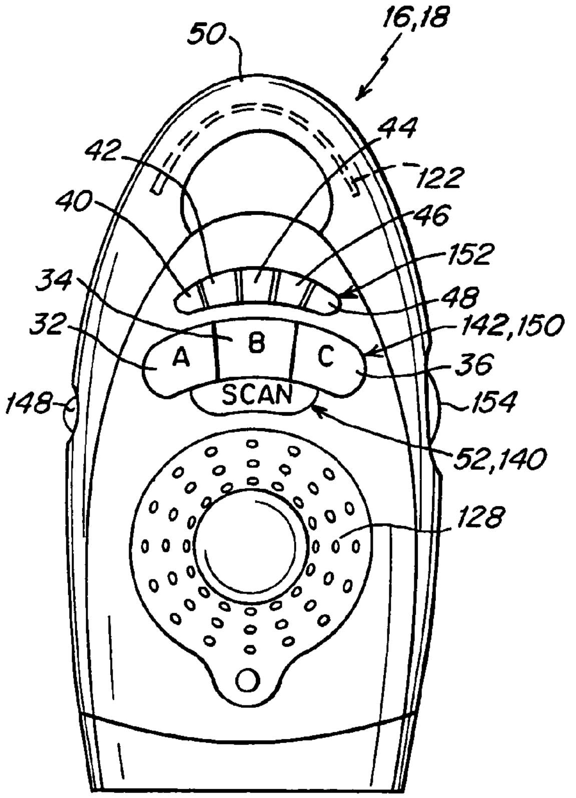
FIG. 4 is a front view of a receiver according to the present disclosure.
Figure 5:
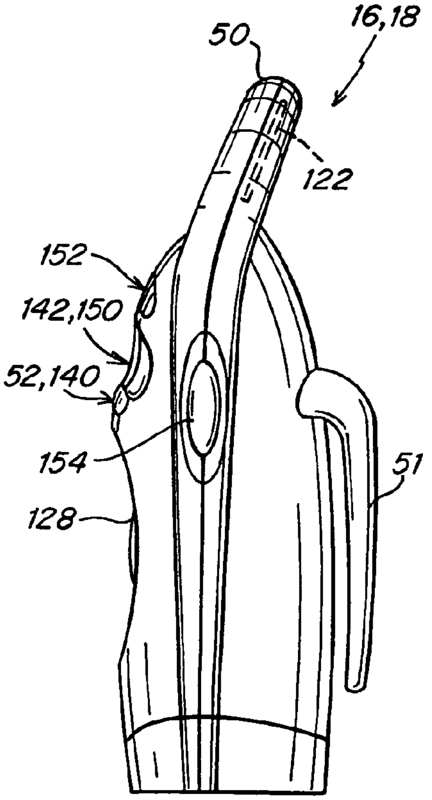
FIG. 5 is a side view of the receiver of FIG. 4.

The receivers 16 and 18 shown in FIGS. 4 and 5 each includes an on/off volume switch 154 and the transmit/receive switch 148 on opposite sides of the receiver 16, 18. The rotation of a dial of the switch 154 turns the receiver 16,18 on and off and adjusts the volume. Pressing the transmit/receive switch 148 converts the receiver 16,18 into a transmitter. A handle 50 includes antenna 122. The receivers 16, 18 also have a handle or U-shaped element 51 which allows it to be carried on a belt.

A schematic or block diagram representation of the electronics is illustrated in FIG. 1. Each of the transmitters 10, 12, 14 includes a transmitter 100 receiving signals from a microphone 102. The signals are transmitted via antenna 104. An on/off switch 106 is provided connecting the transmitter 100 to a power source 108. The power source 108 may be a battery, a rechargeable battery or a plug connectable to a power outlet. Each of the transmitters 10, 12, 14 are shown transmitting a different frequency signal $f_A$, $f_B$ and $f_C$, respectively. As previously described, a channel select 110 may also be provided.

The receivers 16, 18 are also shown having a transceiver 120. They receive their signals from antenna 122. Transceiver 120 transmits a signal at frequency $f_D$, which is received by the other transceiver 120. The various frequency signals received by the transceiver 120 are provided to a multiplex unit 124. The multiplex unit 124 selects one of the frequencies and provides it to the announcer 126, which is shown as having a speaker 128.

As an alternative to the frequency $f_D$ from the transceiver 120 being provided through multiplexer 124, it can be provided directly to the announcer 126, as indicated in the dotted line for receiver 16. This would override any of the signals out of the multiplexer 124. Appropriate logic in the announcer 126 can allow the signal $f_D$ to override any of the outputs of the multiplexer 124.

A switch 130 is shown as a five-position switch having a terminal 132 connected to sequencer 140. The sequencer 140 has an adjustable timer 144 which determines the period of the sequence. This adjustment may be made at the factory. The transmitter select 142 includes four terminals 133, 134, 135, 136 for the four possible frequency selections, including three from the transmitters 10, 12, 14 and one from the other transceiver 120. Switch 130 moves between the sequencer 132 and one of the individually selected frequency switches 133, 134, 135, 136.

Although a simple switch mechanism is shown, the execution of the schematic representation may be made using any known switch structure. It may include individual switches ganged together or may include independent button switches which make a connection when depressed and a disconnecting connection when up. The switches are interconnected such that only one of which at a time would be depressed. Also, the switching function may be achieved electronically using analog or digital logic. As with the transmitter, the receivers may be a battery, a rechargeable battery or a plug connected to a power outlet.

The announcer 126 also includes the transmitter indicator 150 and the level indicator 152. Transmitter indicator 150, as previously discussed with respect to FIGS. 4 and 5, may be three individual lights lit to indicate which transmitter is being announced. Alternatively, it can be a digital display indicating which transmitter is being received. The level indicator 152, again as illustrated in FIGS. 4 and 5, may be a series of panels lit to indicate the level or may be a digital indicator.

A combination on/off volume switch 154 is provided to the announcer 126. Alternatively, a separate on/off switch and volume control may be provided. Power source 156 is connected to the on/off volume switch 154. Transceiver 120 of receiver 16, 18 includes a transmit/receive switch 148. Transceiver 120 include channel selector 146, which, as previously described, pick one of the transmitting channels for each of the transmitters 10, 12, 14.

Although the present disclosure has been described and illustrated in detail, it is to be clearly understood that this is done by way of illustration and example only and is not to be taken by way of limitation. The scope of the present disclosure is to be limited only by the terms of the appended claims.

What is claimed is:

1. A remote child monitoring system comprising:

a plurality of transmitters for monitoring audio at different locations and automatically transmitting the monitored audio at different frequencies from the different locations;

at least one receiver remote from the transmitters for receiving and announcing the transmitted audio from the plurality of transmitters;

the receiver having a first mode for sequentially announcing the transmitted audio from the transmitters and a second mode for announcing the transmitted audio from a selected transmitter;

wherein the receiver includes a different indicator for each transmitter and indicates which transmitter is being announced; and wherein each transmitter has a different color housing, and the indicators have a corresponding color.

2. The system according to claim 1, wherein the receiver continuously and sequentially announces the transmitted audio from the transmitters in the first mode.

3. The system according to claim 1, including at least two transmitters, and at least one of which is portable.

4. The system according to claim 3, including at least two receivers, each having the first and second modes.

5. The system according to claim 1, including at least two receivers, each having the first and second modes.

6. The system according to claim 5, wherein at least one of the receivers is portable.

7. The system according to claim 5, wherein at least one of the receivers has a transmission mode.

8. The system according to claim 1, wherein the receivers in the first mode announces the audio for each transmitter for a period of 3 to 10 seconds.

9. The system according to claim 1, wherein the transmitters transmit continuously when turned on.

10. The system according to claim 1, wherein the transmitter includes a switch to select one of at least two frequencies of transmission, and the receiver includes indication of which transmitter is being announced.

11. The system according to claim 10, wherein the receiver includes a switch to select one of at least two frequencies of transmission for each of the transmitters.

12. The system according to claim 1, wherein the receiver includes indication of which transmitter is being announced.

13. The system according to claim 1, wherein the receiver includes indication of which transmitter is being announced and level of the audio being received.

14. The system according to claim 1, wherein the receiver includes indication of which transmitter is being announced and a strength of received signal being announced.

15. The system according to claim 1, wherein the receiver includes indication of a strength of received signal being announced.

16. The system according to claim 15, wherein the level indication is a group of indicators activated accumulatively to indicate the level as a group.

17. The system according to claim 1, including a control for selecting between the modes and selecting the transmitter in the second mode.

18. The system according to claim 1, wherein the control includes a first button for the first mode and a separate second button for each of the transmitters.

19. The system according to claim 18, wherein the second buttons are translucent and lit when the corresponding transmitter is being announced.

20. The system according to claim 1, wherein the transmitter and the receivers are portable and include a battery source.

21. The system according to claim 1, wherein the transmitter and the receivers include a power source of one of a battery and a plug for a power outlet.

22. A remote child monitoring system comprising:

a plurality of transmitters for monitoring audio at different locations and automatically transmitting the monitored audio at different frequencies from the different locations;

at least one receiver remote from the transmitters for receiving and announcing the transmitted audio from the plurality of transmitters;

the receiver having a first control for selecting sequentially announcing the transmitted audio from the transmitters and a plurality of second controls, one for each transmitter, for selecting and announcing the transmitted audio from a selected transmitter; and wherein each transmitter has a different color housing and the receiver includes buttons having a corresponding color.

23. The system according to claim 22, wherein the second controls each include a translucent button which is lit when the corresponding transmitter is being announced.

* * * * *